Dec. 22, 1942.   H. F. GRAVE ET AL   2,306,213
CURRENT RESPONSIVE DEVICE
Filed May 26, 1941

Inventors:
Hans F. Grave,
Gustav Lingg,
by Harry E. Dunham
Their Attorney.

Patented Dec. 22, 1942

2,306,213

UNITED STATES PATENT OFFICE 2,306,213

CURRENT RESPONSIVE DEVICE

Hans F. Grave, Berlin-Treptow, and Gustav Lingg, Berlin-Neukolln, Germany, assignors to General Electric Company, a corporation of New York Application May 26, 1941, Serial No. 395,314
In Germany May 30, 1940

2 Claims. (Cl. 175—340)

Our invention relates to current-responsive devices and concerns particularly such devices of the iron core dynamometer type.

It is an object of our invention to provide an improved construction and arrangement of the field windings and core of current responsive devices suitable for use in dynamometer type instruments such as wattmeters and alternating current ammeters, voltmeters, relays, recorders, and the like.

It is an object of our invention to provide a current-responsive device which has high current capacity, high sensitivity, and high electrical efficiency with a reliable and durable mechanical construction.

Other and further objects will become apparent as the description proceeds.

A better understanding of the invention will be afforded by the following detailed description considered in connection with the accompanying drawing, and those features of the invention which are believed to be novel and patentable will be pointed out in the claims appended hereto.

Figure 1:
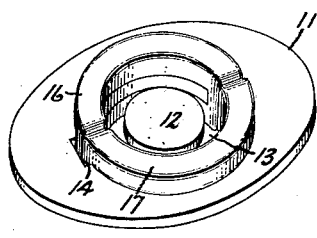
Figure 2:
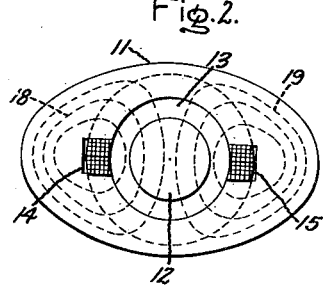
Figure 3:
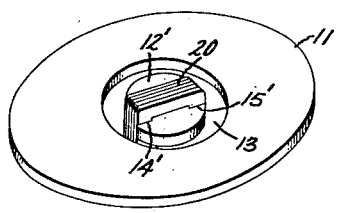
Figure 4:
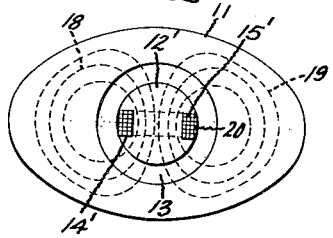
Figure 5:
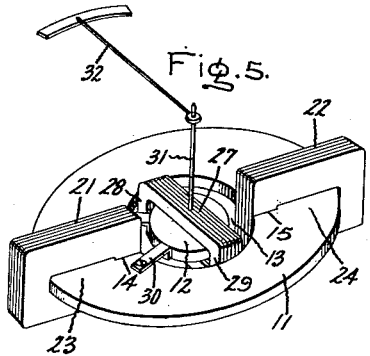

In the drawing Fig. 1 is a perspective view of the field structure of a dynamometer type instrument having a field core composed of magnetizable material; Fig. 2 is a schematic diagram representing a plan view of the arrangement of Fig. 1 showing the flux lines of the magnetic field; Fig. 3 is a perspective view of a modification of the arrangement of Figs. 1 and 2; Fig. 4 is a schematic diagram representing a plan view of the arrangement of Fig. 3 showing the flux lines of the magnetic field; Fig. 5 is a perspective view of an improvement in the arrangement of Figs. 1 to 4, and Fig. 6 is a schematic diagram representing a plan view of the construction of Fig. 5 showing the direction of the lines of flux of the magnetic field. Like reference characters are utilized throughout the drawing to designate like parts.

In accordance with our invention a field winding or stator winding is provided with a magnetic circuit consisting of high-permeability magnetizable material, such as soft iron for example. An annular space is provided in the magnetic material in which a movable coil may be rotatably mounted. In the arrangement of Figs. 1 and 2 there is an outer core 11 having a circular opening surrounding an inner core 12 which is cylindrical in shape and sufficiently smaller in diameter than the opening in the outer core 11 to leave an annular air gap 13 for a movable coil. A pair of diametrically opposed slots 14 and 15 is provided in the outer core 11 to receive a field or stator winding which may be in the form of two coils 16 and 17 having diametrically opposite coil sides fitting in the slots 14 and 15. The coils 16 and 17 may originally be wound in circular form and inserted in the slots 14 and 15 of the outer core 11 before assembly with the inner core 12, whereupon the coils 16 and 17 may be bent over into the shape shown to permit insertion of the center core 12 and to leave space for the rotatable coil with any pointer or other mechanism which may be associated with a rotatable coil.

When current is passed through the field coils 16 and 17 magnetic flux is caused to circulate in the magnetic core members 11 and 12 in two circular groups of flux lines 18 and 19 which circulate around the coil sides which occupy the core slots 14 and 15 as illustrated in Fig. 2. These flux lines cross the annular air gap 13 to produce a suitable flux pattern for causing deflection of a rotatable current-conducting coil which may be rotatably mounted in the air gap 13.

The danger of causing any damage to the insulation of the field coils 16 and 17 by reason of the assembly operation which involves bending them after insertion in the core slots 14 and 15 may be obviated by winding the field coil on a center core 12', as illustrated in Figs. 3 and 4. In this case diametrically opposite slots 14' and 15' are provided in the center core 12' to permit winding a single field coil 20 on the core 12' without filling in part of the air gap 13. This arrangement, however, would necessitate the use of a rotatable coil which would be longer in the direction of its axis of rotation unless the center core 12' were provided with grooves also in the top and bottom to permit fitting the top and bottom of the field coil 20 into such grooves. This might be objectionable, however, in the case of alternating current instruments since the cores 11 and 12' would preferably be composed of laminated pieces or thin plates in order to avoid excessive eddy current losses.

Figure 6:
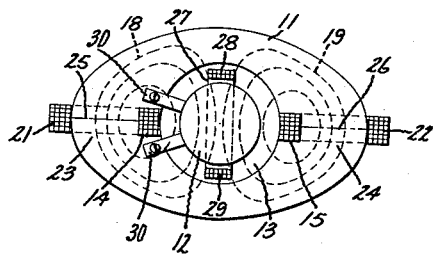

In order to avoid a reduction in cross-section of the magnetic path in the center core produced by the slots 14' and 15', in order to avoid the possibility of excessive heating which might result from the use of fine wire to obtain the requisite number of turns of the coil 20 in the slots 14' and 15' and, at the same time, to permit the use of a rotatable coil of minimum axial length, we may utilize the construction of Figs. 5 and 6. In this case the stator core 11 is provided with diametrically opposite stator-coil-receiving slots 14 and 15 and the stator winding consists of two coils 21 and 22 having coil sides occupying the core slots 14 and 15 respectively. The coils 21 and 22, however, are wound around the diametrically opposite sides 23 and 24 of the stator core 11, which may be roughly elliptical in shape, in order to provide adequate core cross-section in spite of the presence of the slots 14 and 15. If desired, the outer stator core 11 may be composed of symmetrical laminations each forming half of an elliptical figure so that the stator core is divided into two parts by the major axis of the ellipse along dividing lines 25 and 26 (Fig. 6) within the stator coils 21 and 22. This permits the use of preformed stator coils, if desired, and results in substantially no stray or leakage flux since the magnetic joints 25 and 26 are within the stator coils 21 and 22. The effect of the joints 25 and 26 on the magnetic reluctance is negligible in comparison with the air gap 13.

It will be understood that for use with an annular air gap 13 a movable coil 27 may be employed having an axis of rotation substantially coincident with the center axis of the cylindrical center core 12 and having supporting pivots or a shaft 31 lying along the axis of rotation and carrying a pointer 32. Any suitable mounting means for the rotatable coil 27 and the center core 12 may be employed.

In the arrangement of Figs. 5 and 6, the center core 12 may be rotatable with the coil 27 or may be secured to a stationary part of the apparatus in any well-known manner. In the latter case, since the maximum field intensity occurs in the portions 28 and 29 of the air gap 13, these portions of the air gap will preferably be left free for movement of the rotatable coil 27; e. g. the inner core 12 may be secured to the outer core 11 by means of a pair of brass-strip angle brackets 30 screwed to the cores 11 and 12.

We have herein shown and partially described certain embodiments of our invention and certain methods of operation embraced therein for the purpose of explaining its practice and showing its application, but it will be obvious to those skilled in the art that many modifications and variations are possible, and we aim therefore to cover all such modifications and variations as fall within the scope of our invention which are defined in the appended claims.

What we claim as new and desire to secure by Letters Patent of the United States is:

1. A dynamometer type current-measuring instrument comprising a roughly elliptical outer core having a substantially circular opening therein, a stationary center core having a substantially circular outer surface, a field winding and a rotatable winding, the center core being located within the outer core and spaced therefrom around the entire periphery of the center core to leave a substantially annular air gap around the periphery sufficient for the rotatable winding, said rotatable winding being rotatably mounted on an axis of rotation substantially coincident with the axis of the annular air gap and surrounding said center core, said outer core having a pair of relatively short slots cut therein extending radially outward from the circular opening therein and along the major axis of the elliptical outer core and said field winding consisting of current-conducting coil means having coil sides occupying said core slots.

2. A dynamometer type current-measuring instrument comprising a roughly elliptical outer core having a substantially circular opening therein and divided along the major elliptical axis, a stationary center core having a substantially circular outer surface, a field winding and a rotatable winding, the center core being located within the outer core and spaced therefrom to leave a substantially annular air gap sufficient for the rotatable winding, said rotatable winding surrounding said center core and being rotatably mounted on an axis of rotation substantially coincident with the axis of the annular air gap, said outer core having a pair of relatively short slots cut therein extending radially outward from the circular opening in the outer core along the said major elliptical axis so as to be divided thereby, and said field winding consisting of preformed current-conducting coil means having coil sides occupying said core slots and linking said outer core around the lines of division therein whereby the portion of maximum reluctance of the outer core falls within the coil means and the leakage flux is minimized.

HANS F. GRAVE.
GUSTAV LINGG.